Jan. 12, 1926.
H. J. McDONNELL
1,569,821
VEHICLE SIDE CURTAIN
Filed Jan. 3, 1925
2 Sheets-Sheet 1
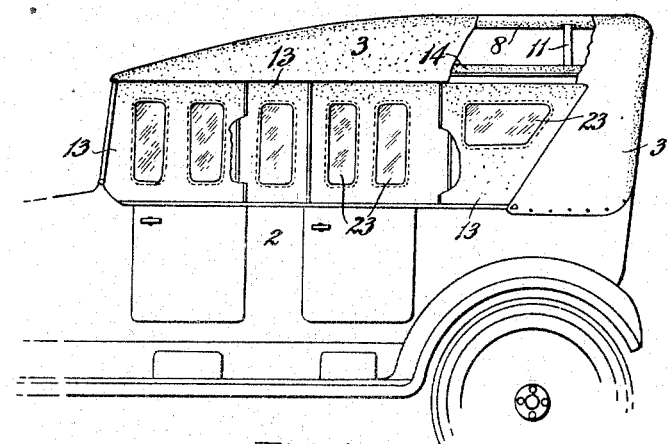
Fig. 1.
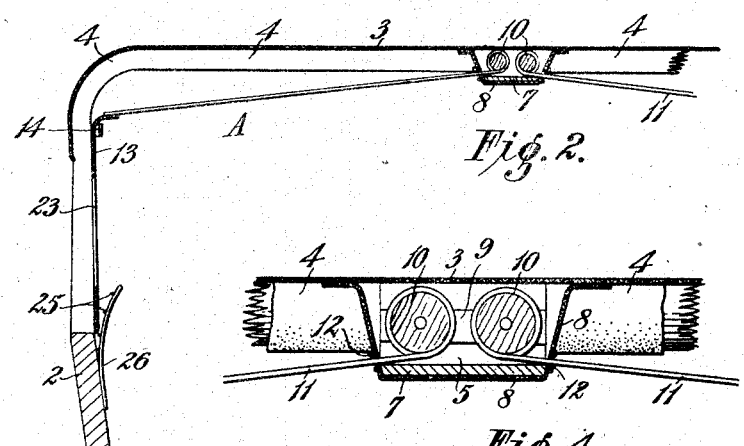
Fig. 2.
Fig. 4.
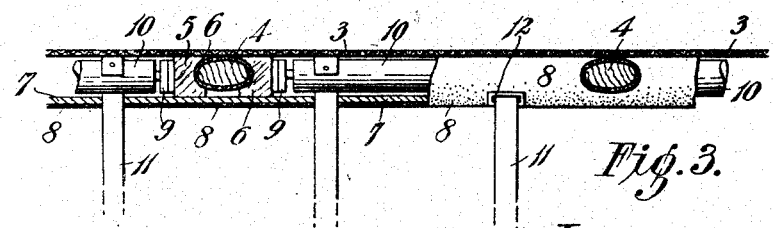
Fig. 3.
Inventor
H. J. McDonnell
By [signature]
Atty.

Jan. 12, 1926.  
H. J. McDONNELL  
VEHICLE SIDE CURTAIN  
Filed Jan. 3, 1925
1,569,821
2 Sheets-Sheet 2
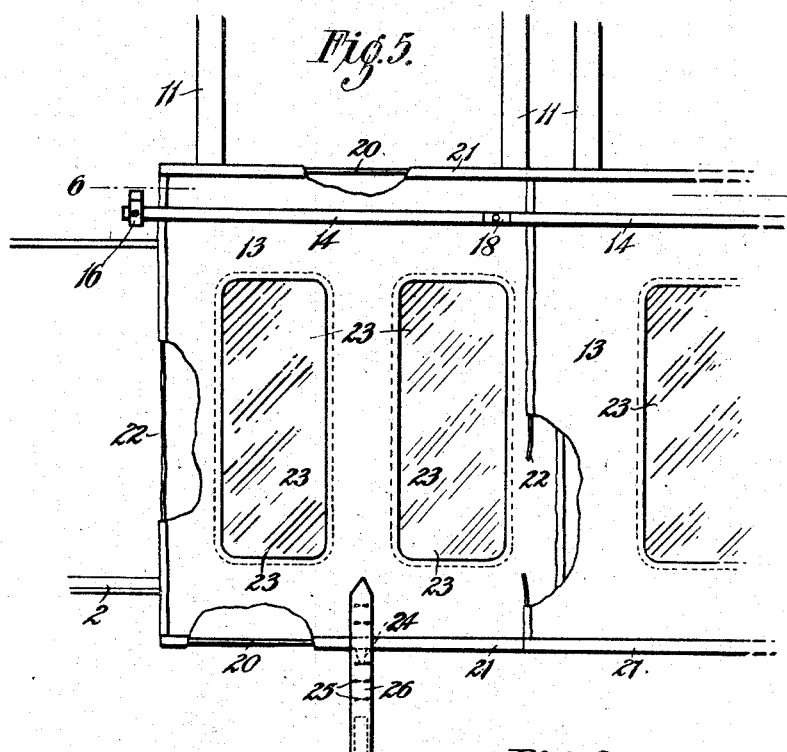
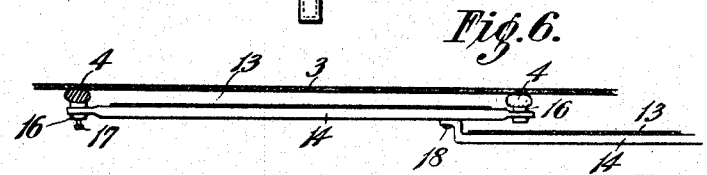
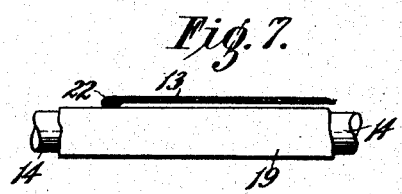
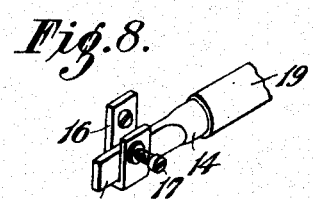
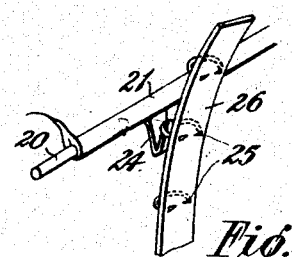
Inventor  
H. J. McDonnell Patented Jan. 12, 1926.

1,569,821

UNITED STATES PATENT OFFICE.

HENRY JOSEPH McDONNELL, OF MOUNT WAVERLEY, VICTORIA, AUSTRALIA.

VEHICLE SIDE CURTAIN.

Application filed January 3, 1925. Serial No. 432.

*To all whom it may concern:*

Be it known that I, HENRY JOSEPH McDONNELL, a subject of the King of Great Britain, residing at Mount Waverley, in the State of Victoria, Commonwealth of Australia, have invented new and useful Improvements in and Connected with Vehicle Side Curtains, of which the following is a specification.

This invention relates to improvements in and connected with side curtains used in motor-cars and other vehicles to protect the occupants from wind, dust and rain.

Side curtains of existing construction consist of shaped pieces of waterproofed fabric, which are detachably fitted to the lower edges of the hood and to the vehicle body by spring buttons, clips or like fastenings. In practice, these curtains are found to be unsatisfactory for the reasons that considerable time and labor are required to fit them in position and also to detach them, and moreover, they are apt to flap about when the vehicle is in motion, thus causing discomfort to the occupants.

This invention has been devised to obviate the disadvantages mentioned by providing side curtains for motor-cars or like vehicles which can be both readily and conveniently arranged in required position capable of adjustment, and will be maintained constantly taut.

According to the invention, a frame or casing is provided longitudinally and centrally upon the underneath surface of the hood of the vehicle, and in said frame or casing there are mounted spring actuated rollers. Passing around each of these rollers are separate connecting straps of thin leather or like flexible material, which extend outwardly to opposite sides of the hood, where they are attached to the upper edges of side curtains. These curtains pass over guide bars which may be detachably fitted to the frame of the hood, and they are each provided at their lower ends with fastening devices for retaining them in drawn position against the influence of the spring actuated rollers.

The curtains are or may be provided at both their upper and lower ends with metal rods to maintain them flat and to prevent flapping, and they are also appropriately bound along their side edges.

Referring to the accompanying drawings—

Figure 1 is a view in elevation, partly in section, of a motor-car equipped with side curtains and fittings according to the invention.

Figure 2 is a transverse sectional view on an enlarged scale of portion of the hood showing the application of my improvements.

Figure 3 is a longitudinal sectional view through the hood or vehicle top.

Figure 4 is a detail sectional view of the frame or casing on the underneath surface of the hood and the spring actuated rollers.

Figure 5 shows in elevation two of the side curtains as viewed from the interior of the vehicle.

Figure 6 is a sectional view on line 6—6 of Figure 5.

Figures 7 and 8 are detail views of the guides for the side curtains.

Figure 9 is a perspective view of one type of fastener that can be used to retain the side curtains in drawn position.

In these views 2 designates the body of a motor-car, 3 the hood and 4 the transverse wooden bows forming the frame of said hood. Fitted on opposite sides of the bows 4 at the central portion of the hood are short blocks 5, which are preferably recessed as indicated at 6 so that they can fit snugly against said bows. Secured to said blocks 5 is a strip 7 of thin, light and durable material (such as three-ply wood) which extends longitudinally for the full length of the hood and may be hinged, if desired, to permit it to be readily dismantled if required.

The strip 7 has a fabric covering 8 that has its ends extending upwardly and attached to the underneath surface of the fabric of the hood (see Figure 4). This fabric covering completely conceals from view the blocks 5 and the strip 7, and it is preferably formed of the same material as that from which the hood is made, in order that the interior appearance of the hood will not be impaired.

Revolvably mounted in brackets 9 fitted to the blocks 5 and arranged in pair arrangement are rollers 10, which are of the spring actuated type but are not provided with the usual ratchet and pawl retaining mechanism, so that they always tend to rotate when their springs are wound. Passing around said rollers 10 are connecting straps or bands 11 of thin leather or like flexible material, which pass through holes 12 formed in said fabric covering 8, and extend outwardly to opposite sides of the hood 3, as is shown by Figure 2.

The outer ends of the flexible connecting straps or bands 11 are attached to the upper edges of side curtains 13 which pass over guide bars 14. The guide bars 14 are preferably of round or oval shape in cross-section, and they may have their ends flattened as at 15 to detachably fit into small brackets 16 fitted to the wooden bows 4 of the hood. To retain said guide bars 14 tightly in position in the brackets 16, each of said brackets may be provided with a clamping screw 17.

The curtains 13 are arranged to overlap slightly at their edges, as is shown particularly in Figure 5, so as to thereby prevent the ingress of rain or wind between their meeting edges. To enable this to be effectively accomplished, one end of the guide bar 14 of the overlapping curtain is secured to the guide bar of the adjacent curtain as indicated by 18 in Figure 6, instead of being fastened to the bracket 16.

Each of the guide bars 14 has a fabric covering 19 which may be of the same characteristics as that from which the hood is made.

Both the upper and the lower edges of each of the curtains 13 are provided with rods 20 preferably formed of metal, which are enclosed in hems 21 and serve to maintain the curtains flat and prevent them from flapping while the car is travelling. The curtains are also bound around their side edges with thick cord 22, and these thickened edge portions are adapted to bear against the guide bar 14, as is shown in Figure 7, while the other portions of said curtains are maintained at a short distance from said guide bars. By this means the curtains are prevented from passing around the guide bars 14 at a sharp angle, such as would cause damage to the celluloid panels 23 customarily provided in side curtains of the character described.

Fitted to the lower edge of each of the curtains 13 is a hood fastener 24 which is arranged to engage with one of a series of clips 25 provided upon a strap 26 that is attached to the vehicle body 2.

When the curtains 13 are not in use, they lie in the position indicated by "A" in Figure 2, being close against the interior surface of the hood 3 and having their lower ends passing over the guide bars 14.

To bring the curtains into position to protect the car occupants from wind or other adverse weather conditions, the lower edges of said curtains are pulled downwardly to cause the flexible connecting bands or straps 11 to unwind from the rollers 10 against the action of the springs of said rollers. The hook fastener 24 is then engaged with the most convenient of the series of clips 25 on the straps 26. By reason of the constant action of the springs of the rollers 10 to cause said rollers to rotate and wind up the flexible connecting straps or bands 11, the curtains are constantly maintained taut and are thus prevented from flapping about when the car is travelling and causing discomfort to the occupants.

When the hook fastener 24 is released from the clip 25 on the strap 26, the rollers 10 are rotated by the action of their springs and the flexible connecting straps 11 are wound upon said rollers to cause the curtains to be automatically returned to their positions close against the interior surface of the hood.

An important feature of the invention resides in the provision of means whereby the side curtains of a motor-car or like vehicle can be drawn downwardly to an extent that is found desirable by the occupants, and is maintained taut at any such selected position.

What I do claim is:—

1. An automobile hood provided with side curtains, a casing fitted to the top of the hood and including blocks fitted to the end bows, a strip secured longitudinally to said blocks, a cover attached to said strip and having its ends fixed to the hood material, spring actuated rollers in the casing, and flexible connections between said side curtains and rollers.

2. An automobile hood provided with side curtains, a casing fitted to the interior surface of the top of the hood, spring actuated rollers in the casing, flexible connections between the side curtains and the spring actuated rollers, guide bars for said curtains, the guide bars being arranged to cause the curtains to overlap, and fastening means for the curtains.

3. An automobile hood provided with side curtains, a casing fitted to the interior surface of the top of the hood, spring actuated rollers in the casing, flexible connections between the side curtains and the spring actuated rollers, guide bars for said curtains, the guide bars for one curtain extended beyond the adjacent end of the guide bars for the adjoining curtain, whereby the curtains are caused to overlap and fastening means for the curtains.

In testimony whereof I affix my signature.

HENRY J. McDONNELL.